May 19, 1942.  T. M. WRIGHT  2,283,840
AUTOMATIC PHONOGRAPH
Filed July 27, 1939  11 Sheets-Sheet 1

INVENTOR.
THEODORE M. WRIGHT.
BY Lockwood, Goldsmith & Galt.
ATTORNEYS.

May 19, 1942.  T. M. WRIGHT  2,283,840
AUTOMATIC PHONOGRAPH
Filed July 27, 1939   11 Sheets-Sheet 3

INVENTOR.
THEODORE M. WRIGHT.
BY Lockwood, Goldsmith & Galt
ATTORNEYS.

May 19, 1942.　　　　T. M. WRIGHT　　　　2,283,840
AUTOMATIC PHONOGRAPH
Filed July 27, 1939　　　　11 Sheets-Sheet 4

INVENTOR.
THEODORE M. WRIGHT.
BY Lockwood, Goldsmith & Galt.
ATTORNEYS.

May 19, 1942.　　　T. M. WRIGHT　　　2,283,840
AUTOMATIC PHONOGRAPH
Filed July 27, 1939　　　11 Sheets-Sheet 9

FIG. 9

INVENTOR.
THEODORE M. WRIGHT.
BY Lockwood, Goldsmith & Galt
ATTORNEYS.

May 19, 1942.  T. M. WRIGHT  2,283,840
AUTOMATIC PHONOGRAPH
Filed July 27, 1939  11 Sheets-Sheet 10

INVENTOR.
THEODORE M. WRIGHT.
BY Lockwood, Goldsmith & Galt
ATTORNEYS.

May 19, 1942.  T. M. WRIGHT  2,283,840
AUTOMATIC PHONOGRAPH
Filed July 27, 1939  11 Sheets-Sheet 11

INVENTOR.
THEODORE M. WRIGHT.
BY Lockwood, Goldsmith & Galt.
ATTORNEYS.

Patented May 19, 1942

2,283,840

UNITED STATES PATENT OFFICE 2,283,840

AUTOMATIC PHONOGRAPH

Theodore M. Wright, North Tonawanda, N. Y.,
assignor to The Rudolph Wurlitzer Company,
Cincinnati, Ohio, a corporation Application July 27, 1939, Serial No. 286,784

11 Claims. (Cl. 274—10)

This invention relates to an automatic record changing device for use in phonographs employing the usual disc record to which a sound reproducer is presented to reproduce and amplify sound transmitted thereby.

The particular feature of the invention resides in an automatic mechanism for rendering the record changing device ineffective or inoperable, while permitting play of a manually positioned record of larger diameter than those automatically presented for playing. Thus, wherein the record changing device will automatically present for playing a plurality of 10-inch records supported in a stack, it will permit a 12-inch record to be placed on top of the 10-inch stack and reproduced. This is accomplished by providing mechanism actuated by the 12-inch record placed on the stack which will disconnect the automatic mechanism of the device until the 12-inch record is removed, whereupon the automatic mechanism again becomes effective for functioning. More particularly, the invention pertains to that type of automatic record changing device shown and described in Letters Patent No 2,096,718, issued August 18, 1936, to Otto A. Hokanson.

Whereas the automatic record changing device of the above-mentioned letters patent is constructed primarily to automatically play a series of 10-inch records, this invention is directed to such a machine for playing a 12-inch record if so desired, by merely placing such record upon the stack of 10-inch records already in place upon the turntable.

Other objects and features of the invention will be understood from the accompanying drawings and the following description and claims:

Fig. 1A is a front elevation of the automatic phonograph showing it in selective playing operation, with parts removed. Fig. 1B is the same as Fig. 1A showing a front elevation thereof. Fig. 6A is a plan view of certain other control elements, more particularly relating to the tone arm trip mechanism. Fig. 6B is a perspective view showing certain elements of the control mechanism of the phonograph. Fig. 6C is a fragmentary top plan view of the selector-controlled clutch governing mechanism. Fig. 6D is a fragmentary side view, partially in section, showing the means for cancelling the selector mechanism.

Figure 1:
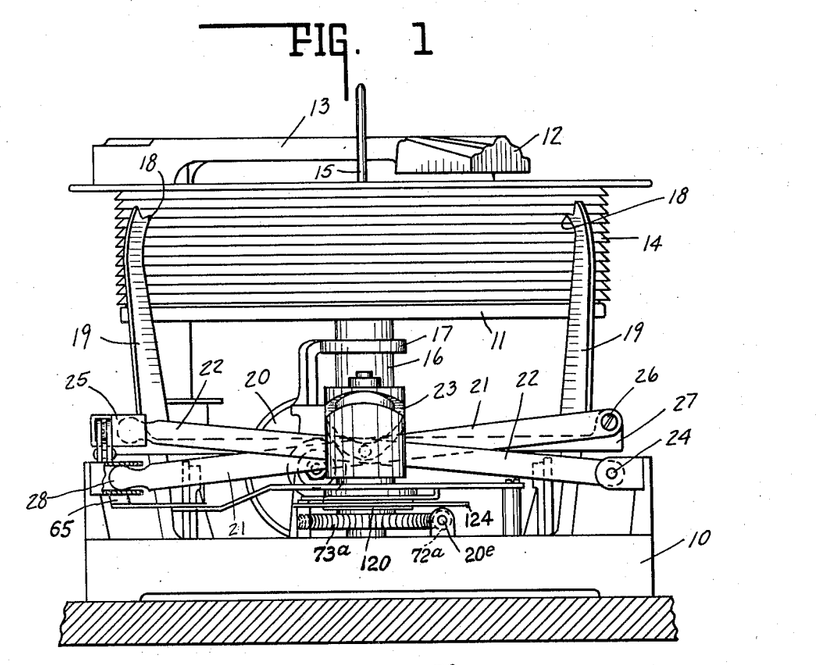
Fig. 1 is a side elevation of the automatic phonograph showing the parts in position for playing a larger size record than those contained in the stack.

The invention herein shown is adapted to be applied to and made a part of that type of record changing device shown and described in Letters Patent No. 2,096,718, issued August 18, 1936, to Otto A. Hokanson, wherein, as illustrated in Fig. 1, there is provided a supporting frame 10, turntable 11, reproducer 12 and tone arm 13. Mounted upon the turntable of such a record changer there is a plurality of record receiving trays 14 supported one upon the other in stack formation. Each tray is adapted to receive and support a 10-inch phonograph record centered by an elongated centering pin 15. Suitable means, as hereafter described, is provided for elevating the turntable through the medium of the turntable supporting collar 16 vertically slidable in a bearing bracket 17.

The turntable is adapted to be elevated to a record selecting position for presenting a selected tray 14 in the plane of the fingers 18, whereupon said fingers are caused to move inwardly to engage the tray immediately above the selected record supporting tray for elevating the superimposed trays to expose the top surface of the selected record for engagement by the reproducer. The reproducer and tone arm are adapted to swing into the overhead space created by the separation and elevation of those records above the record to be played, as shown by way of illustration in Figs. 1A and 1B. The turntable is continuously rotated through both the playing and record changing operation by a worm 20a and gear 20b which drive a spindle 20c extending through the collar 16, all driven by a motor 20.

Figure 6:
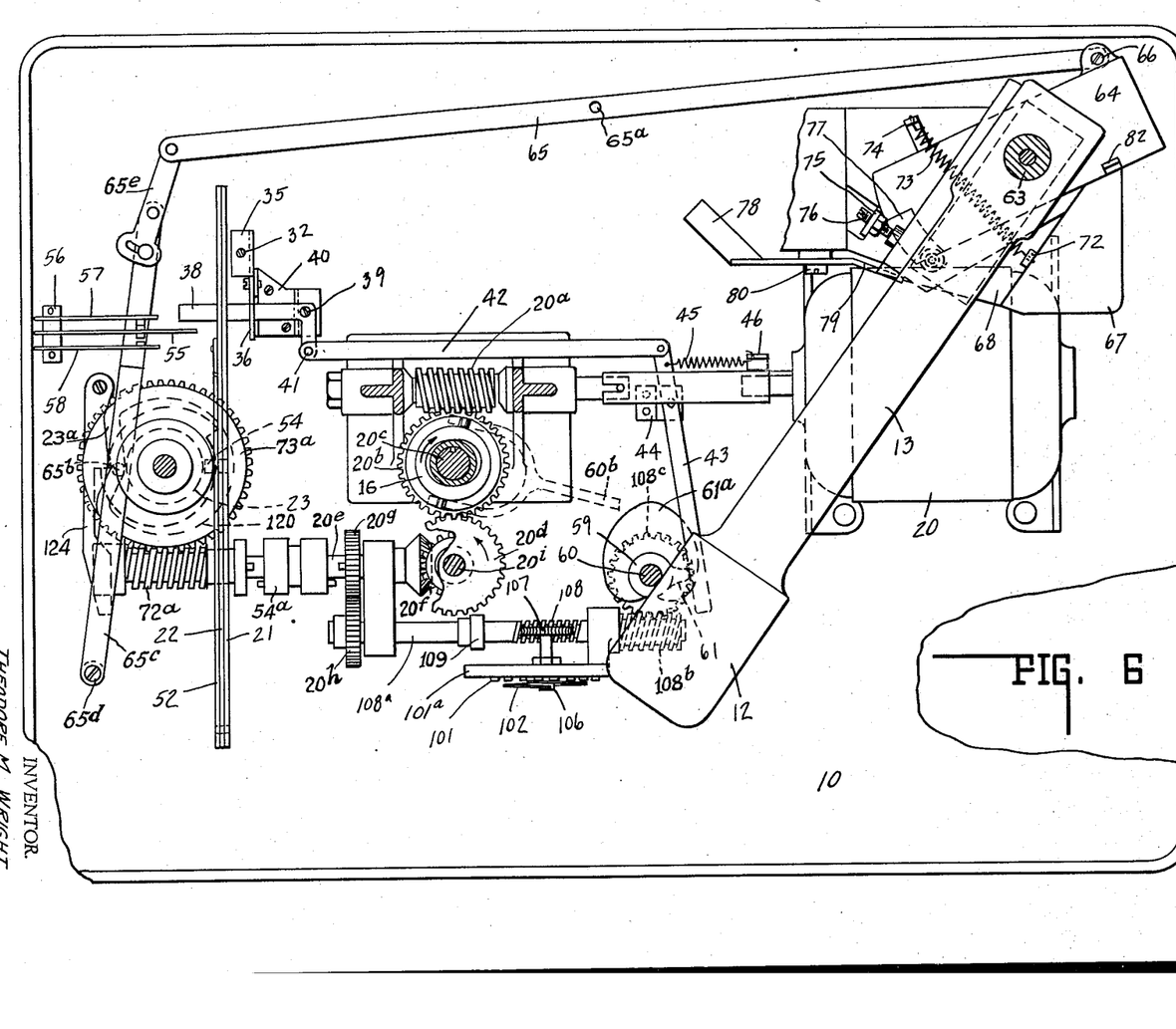
Fig. 6 is a plan view of certain elements of the control mechanism of the phonograph.
Figure 8:
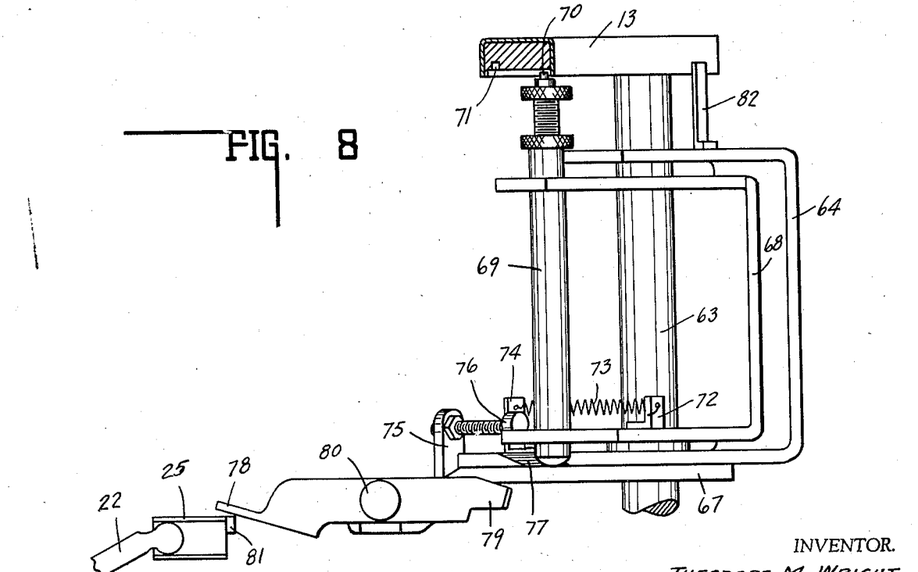
Fig. 8 is an elevation, partly in section, and with portions broken away, showing the tone arm elevating and control mechanism.

The motor 20, through gear 20b, also drives the record changing mechanism and tone arm control (Figs. 6 and 6A). Thus, gear 20b drives gear 20d which drives the clutch shaft 20e through the beveled gears 20f. The clutch 54a is slidably keyed to said shaft 20e in position to engage and drive the worm 72a when moved to one position, and the gear 20g when moved to the opposite position. When the clutch is in neutral position, the turntable rotates to cause a record to be reproduced. When it is positioned to drive the worm gear 72a, the tone arm is actuated and the records raised or lowered relative to the turntable.

Upon the clutch being moved to engage gear 20g, the shaft 108 will be driven through gear 20h. Said shaft is provided at its extreme end with a worm 108b which drives the shaft 60 through the worm gear 108c. This drive controls the elevation of the turntable, through the contact wiper arm 102, and also the motor control switch 223.

The record supporting arms 19 are carried upon the lazytong levers 21 and 22. They are pivoted together intermediate their ends, at which point they are engaged for elevation and retraction by the record elevating cam 23 which is periodically driven during the record changing operation by the motor 20. One end of lever 22 is pivoted to the frame 10 at 24 while its other end is slidably mounted in a cross frame 25. Lever 21 has one end pivoted at 26 to a cross frame 27, while its other end is slidably supported in a pocket 28 of the frame 10. The arms 19 are carried upon the cross frames 25 and 27. Thus, upon rotation of the cam 23 by the motor 20, the central pivoted portion of the lazytong levers is first lowered to replace the elevated records on the played record after its completion, and after the stack of records is adjustably positioned by the turntable, they are elevated to again split the stack for permitting reproduction of the selected record, all as hereinafter more specifically described.

The feature of this invention resides in the mechanism for rendering ineffective said 10-inch automatic record changer upon a 12-inch record being placed on top of the stack, as illustrated in Figs. 2 to 5, inclusive. Thus, wherein each of the trays carries a 10-inch record 29, a 12-inch record 30 may be positioned concentrically thereover. Upon the 12-inch record being placed upon the stack, the automatic record changing mechanism is disconnected other than the tone arm which is caused to operate to play the 12-inch record and repeat it as long as the machine continues operation. But upon the 12-inch record being removed, the automatic record changing mechanism again becomes effective and the tone arm controlled for playing the smaller sized record.

For the above purpose, there is secured to the frame 10 of the machine by a suitable bracket, a cylinder 31 having a plunger rod 32 extending therethrough. The upper end of the rod is positioned to be engaged by that portion of a superimposed 12-inch record which extends beyond the trays carrying the 10-inch records. The lower end of the rod 32 rests upon the plate 35 of a latch bar 36, which bar is normally maintained in latching position by a spring 37. The latching head 47 of the bar is adapted to engage and hold in retracted position a bell crank lever 38 pivoted at 39 to a bracket 40 supported by the frame. One of the bell crank levers is pivoted at 41 to a link 42 which has its other end pivoted to a lever 43 fulcrumed upon a bracket 44 which is supported by the frame 10. A spring 45 connected with a fixed bracket 46 on the frame and to the lever 43 normally exerts a force tending to move the free end of the bell crank lever 38 forwardly against a latch head 47 of the latch bar 36.

Figure 3:
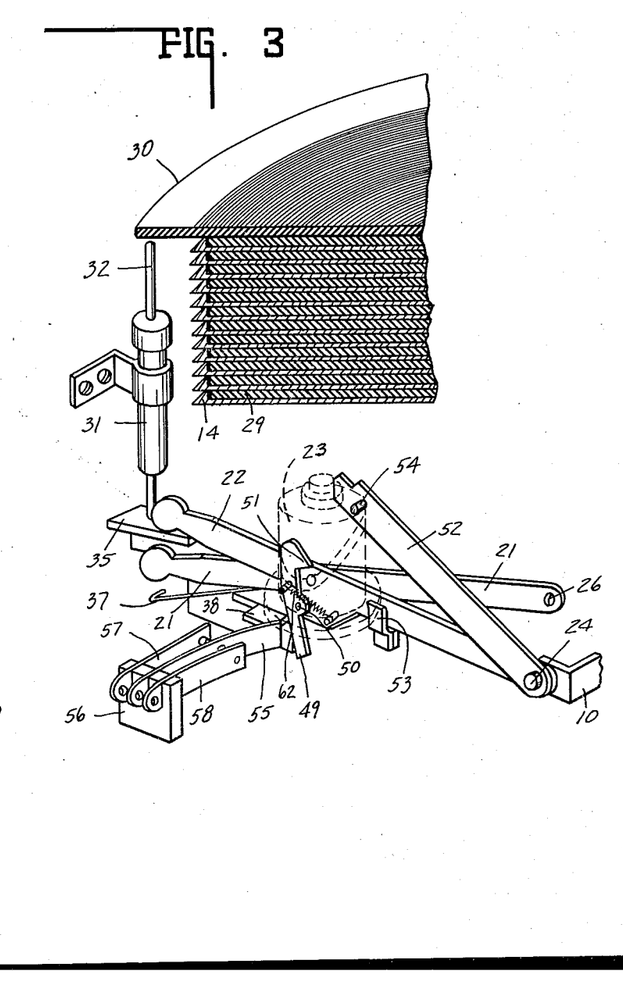
Fig. 3 is the same as Fig. 2 showing the elevating mechanism disconnected for playing a larger size record.
Figures 4, 5, 7:
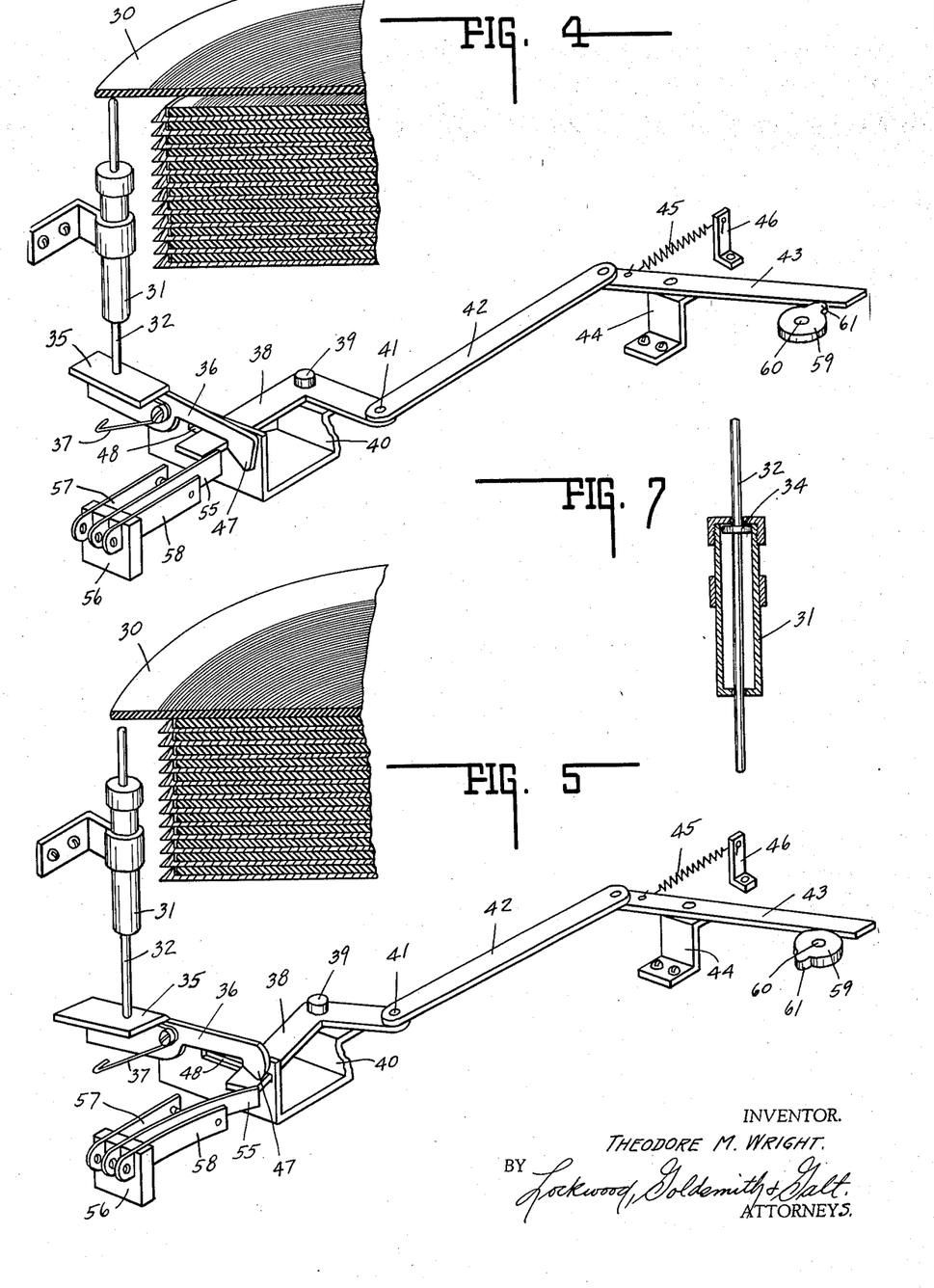
Fig. 4 is a perspective view of the latching and tripping mechanism in its latched position to render the record changing mechanism effective.
Fig. 5 is the same as Fig. 4 showing the latching and tripping mechanism in unlatched position to render the record changing mechanism ineffective to permit manual playing of the larger size record.
Fig. 7 is a longitudinal sectional view of the record actuated rod and its suspension.

Upon the 12-inch record 30 being manually lowered onto the top of the stack, as shown in Figs. 3 and 5, the plunger rod 32 engages and presses down on the latch plate 35 against the tension of the spring 37 so as to raise the head 47 to free the bell crank lever 38 and permit the spring 45 to force it forwardly to the extreme end of a slot 48 carried in one wall of the bracket 40. The latch head 47 is provided with a cam surface on its underside which is engaged by lever 38 acting to depress the plate 35 for allowing the rod 32 to drop by gravity free of the record 30.

Figure 2:
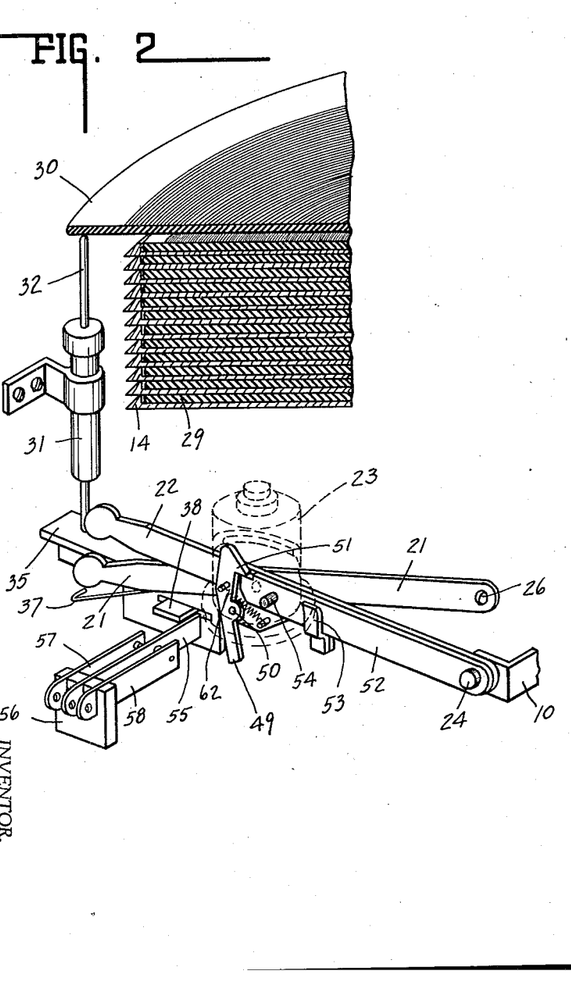
Fig. 2 is a perspective view of the elevating mechanism of the automatic record changing device in effective position before being disconnected to render the record changing device ineffective.

The release of the bell crank lever and its forward movement has the function of disengaging the record changing mechanism,—i. e., the record elevating or stack splitting mechanism. For disconnecting the record elevating or stack splitting mechanism, the free end of the bell crank 38 engages a latch bar 49. Said latch bar is pivoted at 50 to a projection on the lazytong lever 22 and is provided with a latching head 51 positioned to engage the free end of an arm 52 pivoted at its opposite end to the lazytong lever 22 at 24. Lever 22 is provided with a socket 53 in which the arm 52 is adapted to seat so as to normally extend adjacent to and in alignment with said lever. Thus, when latch 49 is in latching position, as shown in Fig. 2, the arm 52 is secured in operative connection with the lazytong lever 22 and works as a part thereof. When the latch is disengaged as in Fig. 3, the arm 52 may move independently of lever 22.

Arm 52 is provided adjacent its free end with a projecting pin 54 which rides up and down upon the cam surface of the cam cylinder 23 as said cylinder is rotated. By means of this arrangement, the lazytong levers 21 and 22 may be disconnected from the cam 23 so as not to function to elevate the records in the stack upon arm 22 being unlatched when the 12-inch record 30 is placed on the stack so as to engage the rod 32.

Upon placement of a 12-inch record on top of the stack, the turntable will be raised and lowered in a manner hereinafter described. But to prevent its selective elevation for splitting the stack to present a selected record, and cause it to always return to its lowermost position so that the manually placed 12-inch record will be in position for play at the top of the stack, the crank arm 38 is arranged to engage the flexible electric contact member 55 when unlatched. Said contact member is secured at one end to the block 56 of the frame 10. By forcing said contact member in the direction indicated in Fig. 5, it is caused to break the circuit through the contact arm 57. This latter circuit controls the selective rotation of the cam for elevating the turntable to a selected position, since all of the selector control switches, other than the one corresponding to the uppermost record, is in this circuit. Thus, upon placing the 12-inch record 30 in position, the turntable will be raised and lowered in the usual manner, but will remain in its lowermost position for the playing of the uppermost record of the stack. At the same time the circuit through the contact arm 58 is maintained closed, which circuit not only functions to position the turntable with the uppermost record exposed, but to control the rotation of the turntable and movement of the tone arm, as will be hereinafter more specifically described.

For the purpose of returning the record changing mechanism to its normal function to raise and lower the turntable and split the stack of records, in event the 12-inch record 30 is manually removed from the top of the stack, a cam 59 is provided, which cam is rotated one revolution with the turntable elevating cam shaft 60 upon tripping of the reproducer and tone arm after the record has been played. Said cam has a projection 61 thereon positioned to engage the free end of the lever 43 and force it against the tension of spring 45 to cause the bell crank lever 38 to move back to its normal position as shown in Fig. 4 from that shown in Fig. 5.

In the meantime, if the record 30 has been removed the spring 37 actuates latch bar 36 to raise the plate 35 and rod 32 causing head 47 to re-engage the bell crank lever 38 and retain it against the tension of spring 45. In this position contact is again made between contact arms 55 and 57 so as to close the circuit through the turntable raising mechanism and a spring 62 on the latch 49 causes it to re-engage arm 52 so that the cam 23 will become effective in elevating the lazytong levers 21 and 22 to raise certain of the records to split the stack. If, however, the record 30 remains in position on the stack or has been replaced by another 12-inch record, the latch bar 36 will be retained in its releasing position so that the spring 45 will again and immediately function to disconnect the record and turntable raising mechanism.

In order that the reproducer may be controlled to position it at the beginning of a 12-inch record instead of a 10-inch record, as is normally the case, the following mechanism is provided. The tone arm 13 is pivotally mounted upon the upper end of the post 63 about which a U-shaped bracket 64 is adapted to be swung by the cam controlled link 65 which is pivoted to said bracket at 66. The bracket is supported upon a base plate 67 forming a part of the frame 10. Within the U-shaped bracket 64 there is a second U-shaped bracket 68 which likewise is adapted to swing about the post 63, which bracket 68 carries an upright post 69 having a spring pressed plunger 70 extending from the top thereof into a groove 71 provided in the lower surface of the tone arm 13. Said inner U-shaped bracket 68 is also provided with an ear 72 which is connected through the spring 73 with an ear 74 extending upwardly from the outer U-shaped bracket 64. The base plate 67 is provided with an upstanding projection 75 having an adjustable stop screw 76 thereon positioned to be engaged by the inner edge of the bottom plate of the bracket 68. The bottom plate of the outer bracket 64 is formed with a cam surface 77 upon which the lower end of the post 69 rides, said post extending freely through the horizontal portions of the bracket 68 so as to move vertically therein.

Pivoted to a part of the frame 10 adjacent the base plate 67 there is an angular arm having an actuated portion 78 and a stop portion 79. The stop portion is positioned to be engaged by the inner edge of the bottom plate of bracket 68 when raised by the lowering of portion 78. On the other hand, when portion 78 is elevated about the pivotal mounting 80, the stop portion 79 is lowered so that the bracket 68 passes thereover into engagement with the stop screw 76. The elevation of the portion 78 is effected by the cross bar 25 when said cross bar is elevated by the cam 23 through the lazytong levers 21 and 22.

In the operation of this part of the machine, upon the reproducer reaching the end of the record groove, the mechanism is tripped as hereafter described, which sets it into motion and thereby actuates the several controlling cams 23, 23a. Cam 23a causes the arm 65 to swing the bracket 64 about the post 63. This movement first occurs when the cam surface 77 is moved to engage the lower end of post 69 and raise it to elevate the tone arm and disengage the reproducer from the record. Following such elevation a projection 82 secured to the top plate of the bracket 64 engages the end of the tone arm and causes it to swing with the bracket until the reproducer is positioned beyond the periphery of the records. This movement seats the end of the plunger 70 in the groove 71 of the reproducer so as to in effect carry the inner bracket 68 outwardly therewith against the tension of the spring 73.

The mechanism for initiating the return of the tone arm to starting position after completion of the record, whether a record of the 10-inch size or the superimposed 12-inch record, is illustrated in Fig. 6A. The post to which the tone arm is secured for horizontal movement has a laterally projecting arm 117 provided with a pawl positioned to engage with the ratchet teeth 118 on a lever 119, the ratchet teeth terminating in a stop so that upon the tone arm swinging inwardly to a predetermined inward position, the arm 117 will engage the stop on said lever, or if the trip is effected by the usual eccentric record grooves, the pawl will engage in the ratchet teeth portion 118 so as to tilt the lever 119 in the usual and well known manner to release a lever 151 which is pivoted intermediate its ends.

Said lever is under tension caused by a spring 125 and is pivotally connected to a link 126 at the opposite end thereof from the lever 119. The link 126 engages with a tie bar 127 which is provided with a latching shoulder at 137a engaging with the pivoted clutch control arm 55a engaging with the clutch 54a. Upon lever 151 being unlatched, it causes tie bar 127 to release the clutch lever so that under tension of spring 155 the clutch will be caused to engage and drive worm gear 72a which in turn drives the record elevating cam 23 and tone arm swinging cam 23a through gear 73a. The same driving action is imparted to cam 120 having a deep notch 121 and a shallow notch 122, which cam engages lever 124 which is pivoted at 123, said lever being provided with a detent shoulder adapted to engage in the notches 121 and 122. Said lever 124 is pivotally connected with the tie link 127 and held against the cam by a spring 130. By means of this arrangement, upon the tone arm moving inwardly to the inner grooves of the record, the clutch will be released to drive the record changing and tone arm control mechanism in the above manner.

To return the lever 151 to latching position for the next operation, lever 151 has pivoted thereto for limited movement, an arm 128 extending in position to be engaged by the pin 65a on the link 65. Thus, when the tone arm is swung outwardly by link 65, arm 128 will be actuated to reset lever 151.

The first movement of the record changing mechanism is to raise and swing the tone arm free of the record followed by the lowering of the records on the turntable stack. Thus, upon release of the clutch lever 55a and the action of the spring 155, the cam gear 73a is rotated in a counterclockwise direction so that the cam groove 23a (Fig. 6) acts upon the pin 65b of the arm 65c. Said arm is pivoted at one end at 65d to the base of the machine and is connected by a link 65e through the link 65. Thus, cam 23a actuates link 65 to swing the tone arm free of the record. Immediately following this action, cam 23, acting through the levers 21, 22, lowers the raised portion of the record stack onto the portion supported by the turntable. Upon this occurring, lever 124 (Fig. 6A) drops into the notch 121 of cam 120, which is the deeper of the two notches, thus permitting spring 130 to move the tie rod to the right, carrying with it the clutch lever 55a. Owing to the depth of notch 121 this movement carries the clutch to its extreme opposite position for clutching engagement with the gear 20g. At this point the cam gear 73a ceases to revolve, whereas the turntable raising gear 108c is driven through shaft 108a.

To elevate the turntable for presenting the selected record opposite the fingers 18, the turntable supporting collar 16 is engaged by a turntable elevating arm 60b having a forked arm embracing the collar and pivoted thereto (Figs. 1A, 6). The opposite end of said arm is pivotally supported to the base of the machine 10 at 60g and carries a pin intermediate its ends at 60e riding upon the cam surface 60a rotating with the gear 108c. Thus, the elevation of the turntable to present the selected record is controlled by the relative position of the cam 60a.

The rotative position of the cam 60a to thus elevate the turntable to its selected position is controlled by the electromagnet 113, as is also the switch control cam 61 and the cam 61a which causes the actuated selector buttons to be returned upon the circuit being closed through their respective switch elements. Thus, upon the electromagnet 113 being energized in the manner hereinafter described, when a circuit is closed through a selected contact 101, the armature 114 is attracted thereby to the position shown in dotted lines in Fig. 6A. This movement of the armature swings the arm 115 against the arm 115a under tension of the spring 115b until the free end of arm 115a moves into the path of rotation of the pin 115c rotating with the gear 20d driving one of the beveled gears 20f. The pin 115c acts to force the arm 115a against the end of a slidably mounted rod 115d which is pivotally connected to the clutch lever 55a. Through this action the clutch lever is moved to the left, which causes the clutch to disengage its driving connection with gear 20g and immediately bring to rest the turntable elevating cam 60a with the turntable at the proper elevation to present the preselected record.

The clutch is thereupon again moved to its other extreme position for rotating worm 72a and cam gear 73a through another half revolution which acts to raise the superimposed stack of records from the selected record by elevation of the arms 19 caused by the rotation of cam 23. Similarly, cam 23a rotates therewith to effect return movement of the tone arm to the beginning of the record through its action on the arm 65c and link 65.

Such half revolution of the cam gear 73 brings the shallow notch 122 into alignment with the lever 124 so that said lever drops therein and allows the spring 130 to move the tie rod 127 to the right just far enough to push the clutch lever 55a to its intermediate position. This brings the record changing mechanism to a stop, while permitting rotation of the turntable.

Through the mechanism heretofore described and illustrated in Figs. 2, 3, 4 and 5, it will be understood that the rotation of cam 23 is rendered ineffective to elevate the levers 21 and 22 and, therefore, there is no elevation of superimposed records when a 12-inch record is placed on top of the stack. However, the cam gear 73a is rotated in the manner above described which still functions to rotate the cam 23a to raise and swing the tone arm to its outer position and return it to playing position. Also the clutch 54a acts to effect a driving connection with the turntable elevating cam 60a which functions to raise and lower the turntable in the manner above described. However, the cam controlled elevation of the turntable has already been pre-set so that it returns for the playing operation to its lowermost position and thereby presents only the top record of the stack to the reproducer (the top record in the stack in this instance being the superimposed 12-inch record). This is automatically accomplished and controlled by the flexible electric contact member 55 (Figs. 3, 9).

As shown in Fig. 3, the placement of the 12-inch record on the stack causes engagement of the member 55 by the bell crank 38 to break contact with the contact arm 57. Thus, the record selecting circuit is broken through the selective switch lever 98a and their associated contact terminals 101. As a result thereof, the electromagnet 113 is not energized throughout the movement of the contact member 102 rotating with the cam on shaft 106 until the No. 1 contact member is reached, which closes the circuit through the wire 109. This, of course, closes the circuit through the electromagnet 113 to throw the clutch out and arrest the movement of the elevating cam 60a only when the turntable is in its lowermost position. To maintain the circuit through this one terminal 101, the contact arm 58 remains in circuit closing position with contact arm 55 so that said circuit to this one terminal 101 is closed upon the cam 60a arriving at this particular position.

Following the changing of the record or the movement of the mechanism to reset the reproducer at the beginning of the next record to be played, the cam 23a driven by gear 73a imparts a reverse movement to the link 65 and bracket 64 so as to return them to normal position. This releases the projection 82 from the tone arm and allows it to be moved toward the record by reason of the tension of spring 73 swinging the bracket 68 with post 69 having its plunger engaged in the groove 71 of the tone arm. Spring 73 therefore acts to return the tone arm toward the record until the bottom plate of bracket 68 is stopped either by the adjustable stop 76 for a 10-inch record or the stop portion 79 for a 12-inch record. Continued movement, however, of the link 65 and outer bracket 64 after the inner bracket 68 has been thus stopped moves the cam surface 77 relative to the post 69 so that the lower end of the post slides down the cam surface and is thereby lowered to lower the tone arm into playing position at the beginning of the record. When the needle has engaged the record so that the tone arm may not be further lowered while the post 69 continues down the cam surface 77 the projection 70 on the post is thereby withdrawn from the groove 71. This permits the tone arm to then freely ride over the record groove about the post 63.

Normally, the 12-inch record stop 79 is elevated by the weight of the opposite end of the lever 78 into the path of the lower plate of bracket 68. When the phonograph is functioning normally to play 10-inch records, the elevation of the frame 25 raises arm 81 into contact with the lower surface of portion 78 to elevate the same and depress the record stop 79 below the path of the lower plate of bracket 68. When a 12-inch record is placed upon the stack, the depression of rod 32 thereby, and the action of the other parts consequent thereto, prevents elevation of the frame 25, thereby allowing the stop 79 to remain in its normal raised position. In this position, said stop is engaged by the lower plate of bracket 68 so that it will be arranged to thereby position the reproducer for engagement with the beginning of the 10-inch record.

From the above description it will be observed that the record changing mechanism functions automatically unless a 12-inch record is dropped over the top of the stack into playing position. In that event the weight of the record engaging the plunger rod 32 acts to disconnect both the record selecting mechanism and the record elevating or stack splitting mechanism, while permitting the machine to otherwise operate automatically,—i. e., rotate the turntable and move the reproducer upon reproduction of the record back to starting position for a 12-inch record. In this manner the machine is capable of playing a series of 10-inch records automatically, or a single 12-inch record manually placed thereon.

Figure 9:
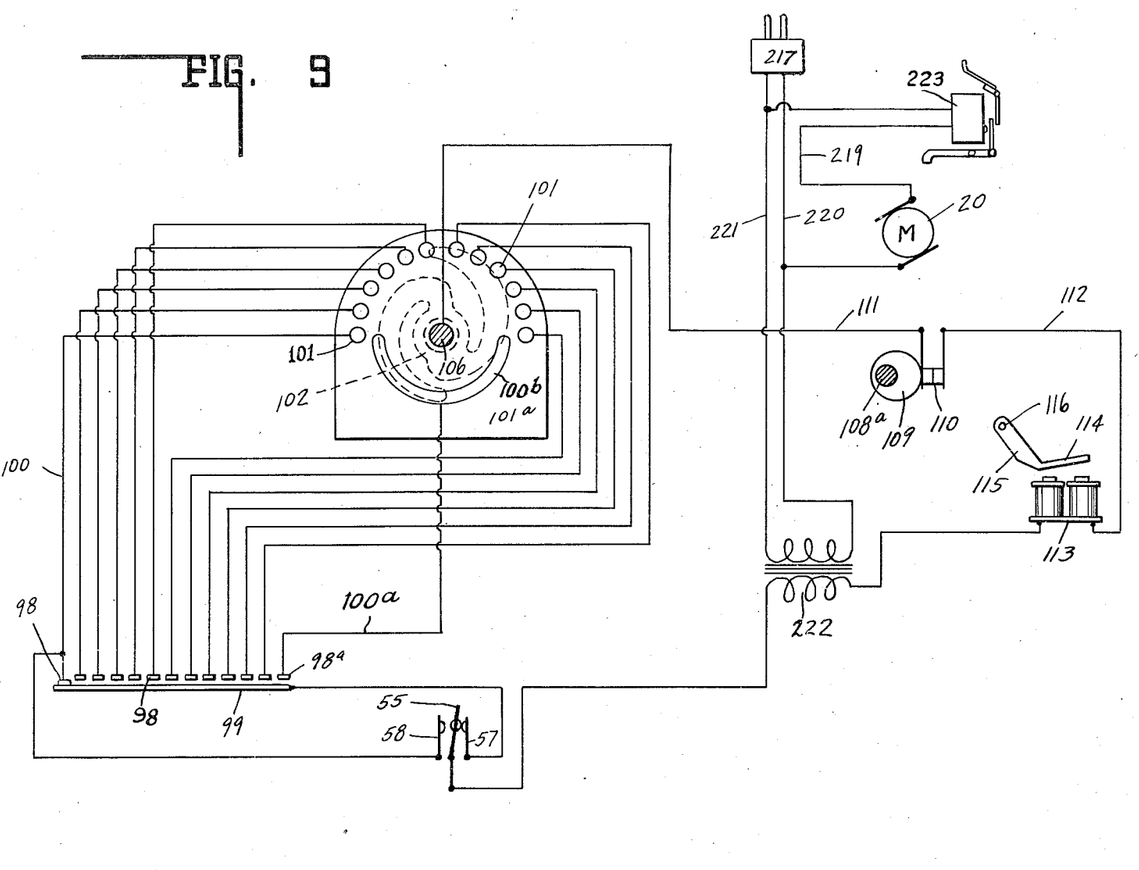
Fig. 9 is a wiring diagram of the record selecting control operating to elevate the turntable to a record selecting position.
Figures 10, 11:
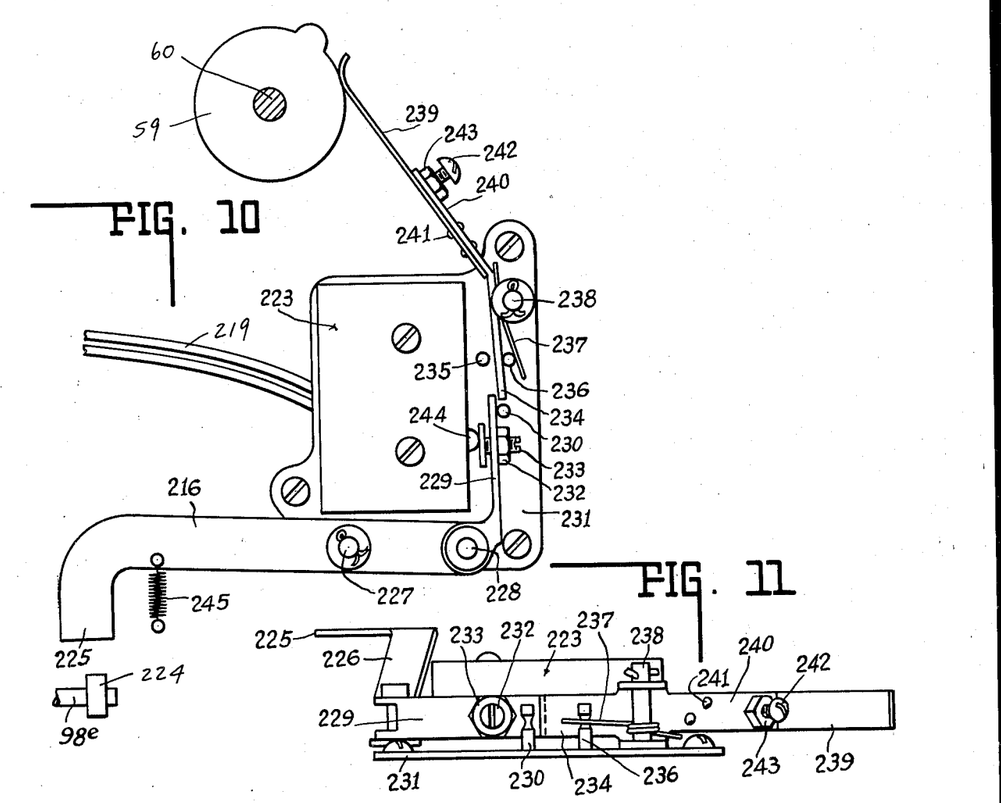
Fig. 10 is a side elevation of the control switch and associated parts in closed circuit position.
Fig. 11 is a top plan view thereof.
Figure 12:
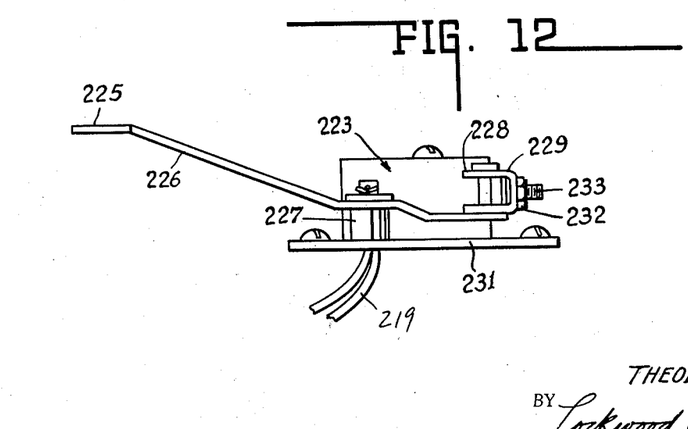
Fig. 12 is a bottom plan view.

In Fig. 9 there is shown a wiring diagram which controls the selection of the record by varying the elevated position of the turntable to present the selected record immediately below the projections 18 of the elevating arms 19 so as to split the stack and elevate the superimposed records and thereby expose the selected record for engagement by the reproducer. For this purpose there is provided button controlled switch elements 98 and a common switch element 99, serving to prepare or pre-set the circuit for automatically effecting, at such time as the circuit is fully established, the playing of the records selected. Leading from the button-actuated switch element 98 there are a series of wires 100 which are connected to the contact posts of an arcuate row of terminals 101 corresponding in number to the 10-inch records in the stack, and with which a wiper arm or contact member 102 is adapted to engage. Said wiper arm is fixed on the shaft 106 having a gear 107 meshing with the worm 108 applied to the countershaft 108a intermediate its ends, as shown in Fig. 6. Said contact member 102, being rotated simultaneously with the drive mechanism, controls the vertical movements of the turntable. The shaft 106 and the contact terminals 101 may be supported by an upright insulating panel 101a rising from the supporting frame 10.

Rotatable with the countershaft 108a is a cam 109 which controls the making and breaking of a switch 110 included in the circuit of the contact member 102, and one terminal of which is connected by wire 111 with the shaft 105 to which said member is fastened. The relative speed of the contact member shaft 105 is such that with each revolution of the shaft 108a the contact member 102 travels a distance equal to that between two adjacent terminals 101. The other terminal of switch 110 is connected by a wire 112 with the electromagnet 113 whose armature 114 is joined to a horizontal swinging arm 115 pivoted at 116. The phonograph can be readily connected to a service line by the plug 217. The plug 217 has leads 220 and 221 connected to the motor 20 through the contact switch 223. Said leads are also connected to the transformer 222 which supplies low voltage to operate the selector mechanism and other parts of the phonograph.

It is here pointed out that in the invention herein set forth, the switch contacts 55, 57 and 58 are interposed in the circuit between contacts 98 and 99. The contact 55 is normally in electrical engagement with contact 57 so that the circuit must pass through the selector switches 98 and their contacts 101 so as to function to elevate the turntable to present corresponding records. When, however, the 12-inch record 30 is placed on the stack, the circuit is broken through the contacts 55, 57 and through the individual control switches 98 so that they will not function to elevate the turntable in elevated position if operated. On the other hand, contact 55 is caused to engage contact 58 for closing a circuit through the particular wire 100 leading to the contact button 101 which is associated with the uppermost record, thereby conditioning the instrument to play only the uppermost record with the turntable in its lowermost position irrespective of any operation of the record selecting buttons. This is the equivalent of conditioning the machine to play the superimposed manually placed 12-inch record.

Wherein it may be desired to automatically play the 10-inch records without selection, a switch element 98a may be associated with the other switch elements 98 to make contact with the common switch element 99. Element 98a is connected by the wire 100a to a contact segment 101b positioned on the insulating panel 101a. Thus, the circuit will be closed through the wiper arm 102, regardless of its position, but will be intermittently broken through the switch 110 controlled by the cam 109 on shaft 108a. Thus, the clutch controlled electromagnet 113 will thereby be energized and deenergized intermittently so that upon each rotation of the cam 109 the rotation of the turntable elevating cam will be stopped at a position wherein the turntable has been elevated to the next succeeding record. Upon playing of said record, the same cycle will take effect as above described, including swinging the tone arm outwardly, lowering the raised records and then rotating the turntable raising cam a distance of one record to present the next record, whereupon rotation will be stopped by the cam 109 having made one revolution to energize the clutch through electromagnet 113. The switch elements 98 are actuated by the protruding buttons 98h, while the switch element 98a is actuated by the single protruding button 98h.

As this invention is applicable to a record selective machine, but wherein no record is selected upon applying a superimposed 12-inch record, it is provided with a micro switch, of well known form, generally designated at 223 (Figs. 10 to 13, inclusive), for controlling the driving motor circuit. In the selective machine, when used selectively, a cancelling bar 131 is provided for returning the selective control switches 98 to normal position after being operated. Said bar is oscillated by a lever 132 which is actuated by the underside of cam 120 upon completion of the playing of the record and during the record changing cycle. Secured upon said cancelling bar there is an arm 224 which, when a selector button 98 has moved the cancelling bar inward to select a record (if the record selecting mechanism is in operation, or, on the other hand, to select the position of the turntable for reproducing the superimposed 12-inch record), said arm 224 bears against the end 225 of the lever 226.

The lever 226 is pivoted at 227 and has upstanding from its farther end a hinge pin 228 upon which is hinged a finger 229. Said finger has its outward movement confined by a stop pin 230 upstanding from the base 231. Approximately midway of the length of said finger it is tapped to receive a flat headed screw 233 which is retained in adjusted position by a lock nut 232. A second finger 234 forms one end of a lever 240 which is fulcrumed at 238. The finger 234 is limited in its movement by being placed between two stop pins 235, 236 similar to pin 230. A torsion spring 237, by pressure against pin 236 and lever 240, biases the finger 234 outwardly away from the micro switch 223. The lever 240 has riveted to it at 241 a flat spring 239 which extends in prolongation of lever 240. A screw 242, locked in place by a nut 243, is threaded through the lever 240 near the end thereof. Its purpose is to alter the relative angular positions of said lever 240 and the spring 239 by exerting pressure upon the latter whereby it is finely adjusted to the movements of cam 59.

As best illustrated in Figs. 6B and 6C, a group of selector switches 98, each of which corresponds to a record, may be singly displaced to select a record in event the machine is selectively used without a 12-inch record placed thereon. Each of said switches is actuated by a selector button 98b arranged to press inwardly upon its respective arm 98c which in turn closes its corresponding switch 98. Each arm 98c is retained in switch opening or closing position by a spring pressed latching ball 98d. Any actuated lever presses upon a common bail 98e having a bearing in the end frames 98f, on the end of which there is provided a crank arm 224 engageable with the end 225 of the switch lever 226. Thus, upon any one of the switches being closed by their respective arms 98c and as long as said arms remain latched in switch closing position by the ball latch 98d, switch 223 will be closed so that the motor continues to operate.

For automatically cancelling out said switch arms 98c to move them to open position, there is provided a cancelling bar 131 which is fulcrumed at its ends on the end plates 98f and has secured at one end thereof an operating arm 131a, the free end of which rides on the lever 132 fulcrumed intermediate its ends upon the base of the machine with its opposite end in the path of rotation of the pin 132a depending from the cam gear 73a. Upon movement of the cam gear and cam 23, after the turntable has been selectively positioned, the pin 132a on said cam rides over the adjacent end of the fulcrumed arm 132, raising the end of the arm 131a which in turn swings the cancelling bar 131 inwardly toward the upper ends of the switch levers 98c.

Slidably mounted on the bar 131 there is a lug 133 connected by the link 134 with the fulcrumed arm 135, which in turn is connected and operated by the pivoted arm 136 pivotally supported upon the base of the machine at 137 and carrying a cam follower 138 held under spring tension against that cam by a suitable spring on its pivotal mounting 137 (the spring not shown). The cam follower thus follows the contour of the cam 61a. Said cam is mounted upon the shaft 60 and conforms to the cam surface 60a acting to selectively position the turntable.

Through this mechanism the cancelling lug 133 is moved on the cancelling rod 131 to a position corresponding with the position of the turntable when elevated to its selective position and, therefore, is opposed to the switch cam 98c which has been moved to close the switch 98a corresponding to the selected record. The movement of the cancelling rod thereby causes the arm 98c to be pushed from its actuated latched position to its inoperative position, the switch being thereby opened. But, any remaining closed switches will not be actuated thereby until the turntable has been elevated to its position corresponding thereto. As long as any of said switches are closed by their switch arms 98c being latched in switch closing position, the bail 98e will maintain the control switch 223 in closed position, so that the machine continues to operate until the last switch arm has been returned. Thereupon, spring 245 moves the bail to open switch 223 and the machine comes to rest, said switch 223 being controlled as hereinafter described. However, it may be noted that the circuit is not broken through the switch 223 until the cam 61 releases it through engagement with the spring arm 229 of said switch.

Figure 13:
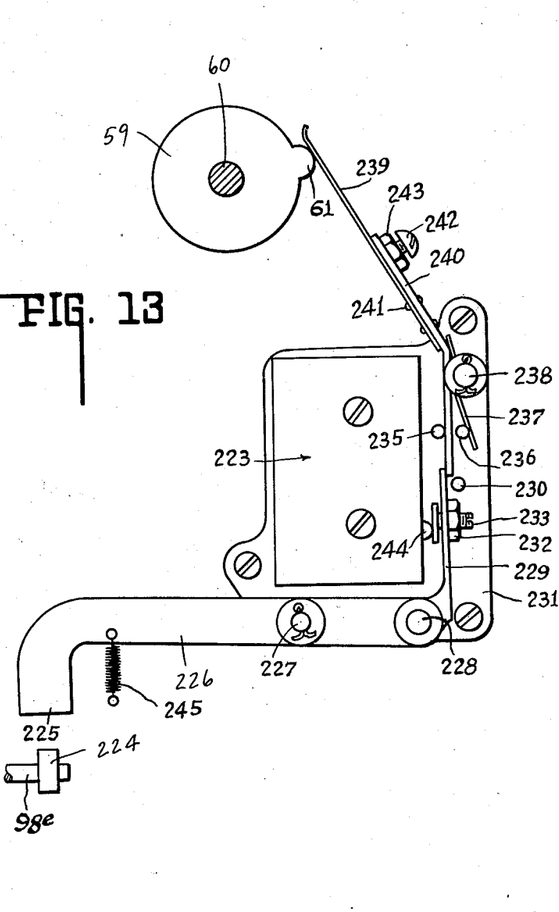
Fig. 13 is the same as Fig. 10 in open circuit position.
Figure 14:
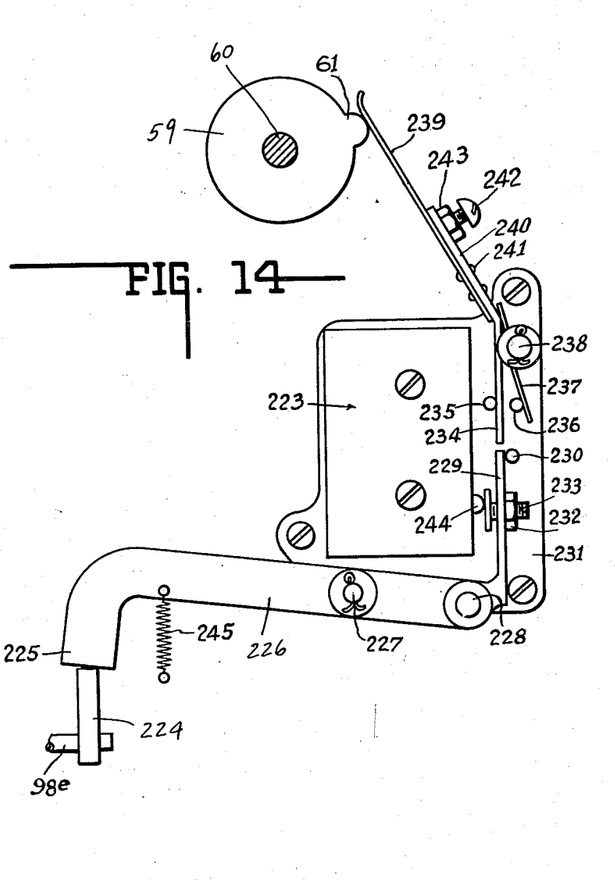
Fig. 14 is the same as Fig. 13 in circuit closed position.

The micro switch 223 is normally closed. Its operation is accomplished by moving its push button 244 a very short distance. Its function is to open and close the circuit of the motor 20 which operates the phonograph. Accordingly, a slight pressure on push button 244 opens the motor circuit and stops the phonograph. Fig. 13 illustrates the first stage in the cycle. Cam 59 pressing on the spring 239 forces the finger 234 against the finger 229 which in turn presses the button 244, holding the micro switch open. Fig. 14 shows an arm 224 pressed against the end 225 of the lever 226, withdrawing the finger 229 from contact with the second finger 234, relieving the pressure on said button which closes the circuit to the driving motor 20. The cam 59 thereupon begins to rotate, relieving the pressure on the spring 239. The arm 224 is returned to inoperative position by the cancelling bar 131 upon operation of the driving motor through the action of cam 120 and lever 132.

The spring 245 urges the end 225 of the lever 226 toward the arm 224, thus replacing the finger 229 in its underlapping position with respect to the finger 234, so as to be in a position to be engaged to press against the button 244 upon reengagement of the spring 239 by the projection on cam 59, to again open the circuit. In the meantime, the record is being played. But upon completion of its playing, cam 59 will be driven until it reaches the position shown in Fig. 13 for applying pressure through the spring 239 to fingers 234 and 229 for pressing the button 244 in said circuit breaking position to stop the driving motor and further operation of the phonograph.

The invention claimed is:

1. In an automatic phonograph, a turntable adapted to receive a stack of records of a predetermined size, means engageable with a record of the stack for separating it from said stack at a predetermined location to expose in playing position the uppermost record of the remainder of the stack, a reproducer movable into playing contact with said exposed record, a depressible member on said phonograph adjacent to said turntable and positioned for engagement and operation by a record of larger size supported upon said stack, and means controlled by said member when operated for rendering said stack engaging and separating means inoperative.

2. In an automatic phonograph, a turntable adapted to receive a stack of records of a predetermined size, means engageable with a record of the stack for separating it from said stack at a predetermined location to expose to playing position the uppermost record of the remainder of the stack, a reproducer movable into playing contact with said exposed record, a depressible member on said phonograph adjacent the said turntable and positioned for engagement and operation by a record of larger size supported upon said stack, and means controlled by the movement of said member to position said reproducer adjacent the periphery of said larger record.

3. In an automatic phonograph, a turntable adapted to receive a stack of records of a predetermined size, means engageable with a record of the stack for separating it from said stack at a predetermined location to expose to playing position the uppermost record of the remainder of the stack, a reproducer movable into playing contact with said exposed record, a depressible member on said phonograph adjacent said turntable and positioned for engagement and operation by a record of larger size supported upon said stack, means controlled by said member when operated for rendering said stack separating means inoperative, and a stop controlled by said last-mentioned means to position said reproducer adjacent the periphery of said larger record.

4. In an automatic phonograph, a turntable adapted to receive a stack of records of predetermined size, mechanism for automatically exposing the various records in the stack for reproduction, a reproducer automatically movable into position adjacent the periphery of the record presented for play, a depressible member on said phonograph adjacent said stack and positioned for engagement and operation by the under surface of a record of larger size supported by said stack, and means controlled by said member when operated for rendering said mechanism inoperative.

5. In an automatic phonograph, a turntable adapted to reecive a stack of records of predetermined size, mechanism for automatically exposing the various records in the stack for reproduction, a reproducer automatically movable into position adjacent the periphery of the record presented for play, a depressible member on said phonograph adjacent said stack and positioned for engagement and operation by the under surface of a record of larger size supported upon said stack, and means rendered effective by the depression of said member to automatically stop said reproducer at a position adjacent the periphery of said larger record.

6. In an automatic phonograph, a turntable adapted to receive a stack of records of predetermined size, mechanism for automatically exposing the various records in the stack for reproduction, a reproducer automatically movable into position adjacent the periphery of the record presented for play, a depressible member on said phonograph adjacent said stack and positioned for engagement and operation by the under surface of a record of larger size supported by said stack, means controlled by said member when operated for rendering said mechanism inoperative, and a stop rendered effective by said means to position said reproducer adjacent the periphery of said larger record.

7. In an automatic phonograph, a turntable adapted to receive a stack of records of predetermined size, mechanism for automatically exposing the various records in the stack for reproduction, a reproducer automatically movable into position adjacent the periphery of the record presented for play, a vertically-disposed depressible member on said phonograph extending adjacent said stack and positioned for engagement and operation by the under surface of a record of larger size manually placed upon said stack, and means controlled by said member when operated for rendering said mechanism inoperative, said means and member being so related as to permit immediate retraction of said member from further engagement of said member by said record upon the initial engagement therewith.

8. In an automatic phonograph, a turntable adapted to receive a stack of records of a predetermined size, mechanism for automatically exposing the various records in the stack for reproduction, a reproducer automatically movable into position adjacent the periphery of the record presented for play, a depressible member on said phonograph adjacent said stack and positioned for engagement and operation by the under surface of a record of larger size supported upon said stack, means for normally supporting said member in non-depressed position movable thereby to retract said member from further engagement by said record upon the initial engagement thereof, and means controlled by said last-mentioned means when operated for rendering said mechanism inoperative.

9. In an automatic phonograph, a turntable adapted to receive a stack of records of predetermined size, mechanism for automatically exposing the various records in the stack for reproduction, a reproducer automatically movable into position adjacent the periphery of the record presented for play, a depressible member on said phonograph adjacent said stack positioned to be initially engaged and depressed by the under surface of a record of larger size manually placed and supported upon said stack, means actuated by said member to permit of its immediate retraction from further engagement by said record upon the initial engagement thereof, and means controlled by said last-mentioned means when actuated for rendering said mechanism inoperative.

10. In an automatic phonograph, a turntable adapted to receive a stack of records of predetermined size, a power drive operatively connected to said turntable for rotating the same, mechanism periodically connected with said power drive for automatically exposing the various records in the stack for reproduction, a reproducer periodically connected with said power drive movable thereby into position adjacent the periphery of the record presented for play, a depressible member on said phonograph adjacent said stack and positioned for engagement and operation by the under surface of a record of larger size manually placed and supported upon said stack, means controlled by said member when operated for rendering said mechanism inoperative to permit play of said larger record, and means actuated by said power drive operable upon completion of the playing of said larger record for rendering said mechanism operative upon its removal from said stack.

11. In an automatic phonograph, a turntable adapted to receive a stack of records of predetermined size, a power drive operatively connected to said turntable for rotating the same, mechanism periodically connected with said power drive for automatically exposing the various records in the stack for reproduction, a reproducer periodically connected with said power drive movable thereby into position adjacent the periphery of the record presented for play, a depressible member on said phonograph adjacent said stack and positioned for engagement and operation by the under surface of a record of larger size manually placed and supported upon said stack, means controlled by said member when operated for rendering said mechanism inoperative to permit play of said larger record, means rendered effective by said last-mentioned means to automatically stop said reproducer at a position adjacent the periphery of said larger record, a trip mechanism actuated by said reproducer upon completion of said play, and means controlled by said trip mechanism and actuated by said power drive operable to render said mechanism operative upon said larger record being removed from the stack.

THEODORE M. WRIGHT.